United States Patent [19]
Yared

[11] Patent Number: 5,261,313
[45] Date of Patent: Nov. 16, 1993

[54] PLUNGER FOR A CONTROL VALVE WITH VARIABLE REACTION FORCE

[75] Inventor: Linda S. Yared, South Bend, Ind.

[73] Assignee: Allied-Signal Inc., Morristown, N.J.

[21] Appl. No.: 919,468

[22] Filed: Jul. 24, 1992

[51] Int. Cl.⁵ .............................................. F16D 31/02
[52] U.S. Cl. .................................. 9/376 R; 41/369.2
[58] Field of Search .............. 91/369.1, 369.2, 369.3, 91/369.4, 376 R, 379

[56] References Cited

U.S. PATENT DOCUMENTS

| | | | |
|---|---|---|---|
| 4,794,844 | 1/1989 | Taft | 91/369.3 X |
| 4,953,446 | 9/1990 | Fecher et al. | 91/369.1 X |
| 5,146,837 | 9/1992 | Inoue | 91/369.2 |
| 5,161,453 | 11/1992 | Yared et al. | 91/376 R |

FOREIGN PATENT DOCUMENTS

| | | | |
|---|---|---|---|
| 195460 | 11/1984 | Japan | 91/369.2 |
| 2074270 | 10/1981 | United Kingdom | 91/369.2 |

Primary Examiner—Edward K. Look
Assistant Examiner—John Ryznic
Attorney, Agent, or Firm—Leo H. McCormick, Jr.; Ken C. Decker

[57] ABSTRACT

A brake booster having an initial output force produced a reaction force acting on a face of a second diameter of a plunger to produce a primary force which opposes an input force, an intermediate output force produced by the reaction force acting on a disc to produce a secondary force which is combined with the primary force to oppose the input force and an optimum output force which is produced from the differences between the input force and primary and second forces to effect a brake application.

6 Claims, 2 Drawing Sheets

PLUNGER FOR A CONTROL VALVE WITH VARIABLE REACTION FORCE

This invention relates to a plunger member for a control valve of a vacuum brake booster to establish an output force with three distinct rates of development corresponding to an input force to effect a brake application.

The rate of development of an output force created by a vacuum brake booster is a linear function of the communication of a reaction force which opposes an input force as modified by various areas in a plunger of a control valve. In operation, the input force applied to a brake pedal moves the plunger to interrupt fluid communication between first and second chambers to thereafter allow a fluid to enter the first chamber and develop a pressure differential across a wall. The pressure differential acts on and moves the wall to develop an output force which is transmitted through a reaction member to an output member which correspondingly moves a piston in a master cylinder. The resistance to movement of the piston produces a reaction force which deforms the reaction member and eventually overcomes the input force to terminate the communication of the fluid to the first chamber in a manner as initially disclosed in U.S. Pat. No. 3,110,031. The rate at which the output force is developed is a function of the input force, the distance the plunger travels to control communication of the fluid to the first chamber, the transfer of the reaction force to the plunger and the effective area of the plunger which receives the reaction force.

The reaction time required to effect a brake application has been reduced by positioning the plunger of a valve structure in a ready position to reduce valve travel in a manner as disclosed in U.S. Pat. No. 4,953,446. This valve structure performs in an adequate manner to effectively develop an output force which is a linear function of the input force.

In U.S. Pat. No. 5,161,451, issued Nov. 10, 1992, structure is disclosed to develop a nonlinear output force by continually modifying the reaction force by a resilient member. In this brake booster, the assist created by the pressure differential acting on a wall is achieved in a shorter time period than with a vacuum brake booster wherein a linear output force is produced. Unfortunately, the nonlinear output force is also communicated back to an operator as ever increasing resistance on the brake pedal and is defined as hard pedal feel. Since most brake applications occur in response to an input force prior to an operator experiencing a hard pedal as when vacuum runout occurs, it is desirable to provide some power assist over a longer operational period of a vacuum brake booster before vacuum runout occurs.

In the present invention, a brake booster was developed having a plurality of distinct rates at which an output force is produced from a soft pedal feel during the normal actuation of a control valve to effect a brake application, an intermediate pedal feel during a demand for a greater output force with faster actuation and a hard pedal feel during a demand for an optimum output force produced by the a combination of manual and power assist input forces. In this brake booster a plunger of a control valve is located in the bore of a hub of a movable wall which separates the interior of the housing of the brake booster into first and second chambers. The plunger has a first diameter that engages a bearing surface on the hub and a second diameter separated by a shoulder. A disc located in the bore adjacent the reaction member has a central opening concentric to the second diameter of the plunger. The second diameter extends thought the central opening to a position where a face on the second diameter is located adjacent the reaction member. During a normal brake application, the reaction force is communicated through the face of the plunger to provide a primary force which opposes the input force applied to a brake pedal to effect a brake application. The initial output force which is a linear function of the product of the area of the face of the second diameter of the cylindrical member and the reaction force. The initial reaction force communicated back to the brake pedal results in a smooth and soft pedal feel as experienced by an operator which provides a rate of output force development to input force applied of about 10:1. When an operator desires a faster actuation and greater force is applied to the brake pedal, plunger moves in the bore until shoulder engages the disc since the input force is greater than the primary force. Thereafter, the reaction force acting on the disc member is also communicated to the plunger as a secondary force which is combined with the primary force to oppose the input force and effectively establish an intermediate output force. The reaction force associated with the intermediate output force which provides a rate of output force development to input force applied of about 20:1 is a linear function of the initial output force and the product of the area of the disc member and reaction force which is communicated back to the brake pedal as a smooth and firm pedal feel as experienced by an operator. If the input force is greater that the primary and secondary reaction forces, as when vacuum runout occurs, the difference thereafter added to the intermediate output force and directly supplied to the piston in the master cylinder to assist in effecting a brake application. When vacuum runout occurs, the reaction force communicated back to the brake pedal to produce a rate of an optimum output force development to input force applied is at a 1:1 ratio and as a result, a hard pedal feel is experienced by an operator.

It is an object of this invention to provide a valve for a vacuum brake booster with a plunger arrangement and reaction member to develop distinct soft pedal feel, an intermediate pedal feel and a hard pedal feel as experienced by an operator in effecting a brake application in response to a desired input force.

It is further object of this invention to provide a valve for a brake booster having a plunger with a first area for receiving a primary reaction force to oppose an input force to control the development of a first output force at a first rate and a second area for receiving a secondary reaction force to oppose the input force to control the development of a second output force at a second rate and when the input force is greater than the primary and secondary reaction forces, the difference is additive to the second output force to develop a third output force at a third rate.

It is another object of this invention to provide a brake booster with a valve to control the development of distinct linear output forces associated with a soft pedal feel, a firm pedal feel and a hard pedal feel as experienced by an operator.

These objects and other advantages should be apparent from reading this specification while viewing the drawings wherein.

Figure 1:
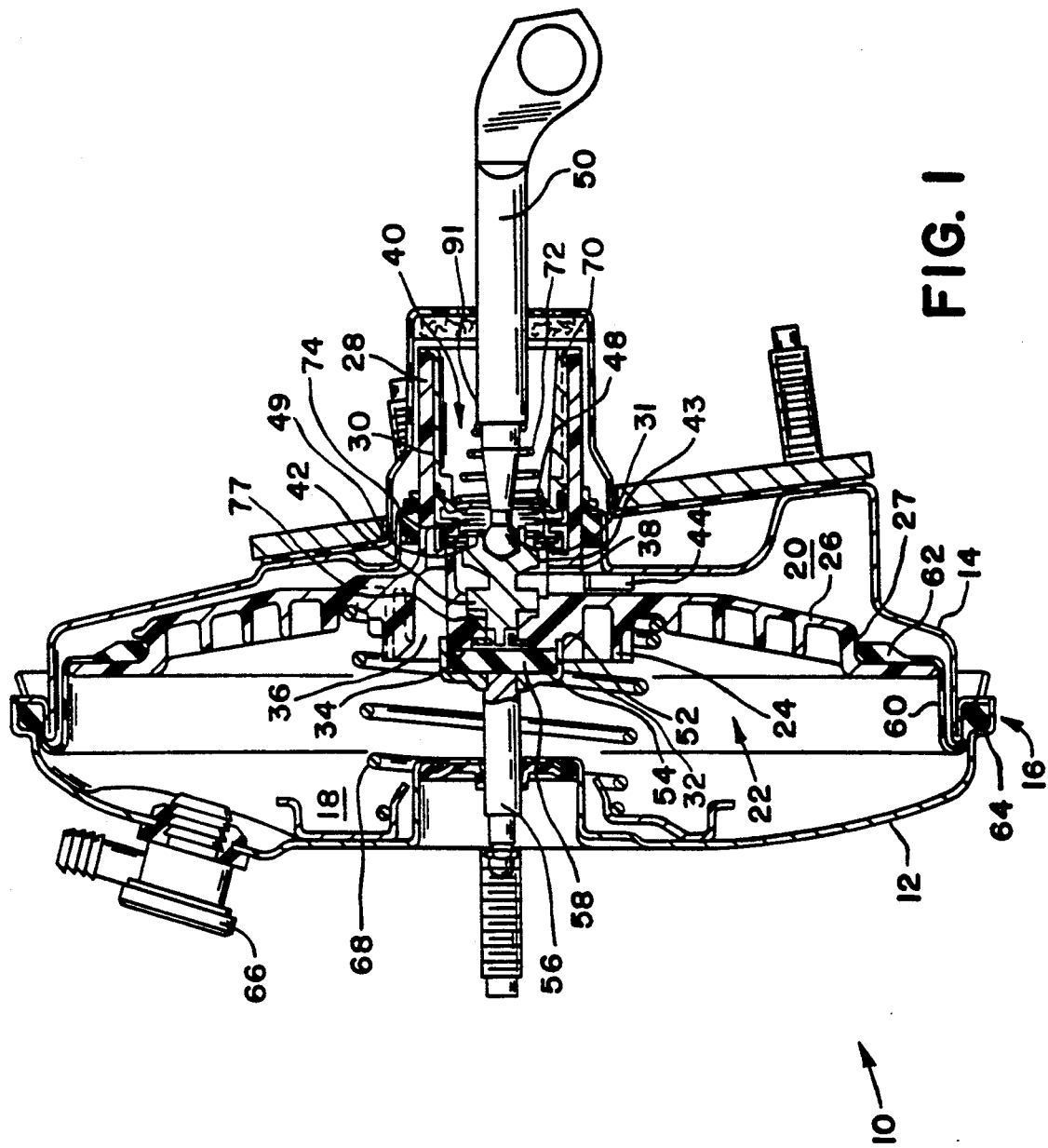
FIG. 1 is a sectional view of a brake booster having a control valve with a plunger arrangement made according to the principals of this invention.

FIG. 1 illustrates a single brake booster 10 of a type disclosed in U.S. Pat. Application 843,678 which incorporates the control valve 40 with a plunger assembly 42 made according to the present invention. The brake booster 10 has a front shell 12 is joined to a rear shell 14 by a twist lock arrangement 16 to form a unitary structure. A wall 22 which includes a radial disc 26 and diaphragm 60 divides the interior of the unitary structure into a front chamber 18 and a rear chamber 20. The radial disc 26 has an integral central hub 24 and a cylindrical projection 28 that extends through the rear shell 14. The diaphragm 60 has a first bead 62 located in a groove 27 on the radial disc 26 and a second bead 64 that is confined by the twist lock arrangement 16 to assure that the front 18 and rear 20 chambers are separated from each other and the environment. The central hub 24 and cylindrical projection 28 have an axial bore 30 which extend therethrough. The front of the central hub 24 has a face 32 with an annular groove 52 that surrounds a bearing surface 34 that extends inward into the axial bore 30. The central hub 24 has a first passageway 36 that extends from the front face 32 to an annular vacuum seat 31 in the axial bore 30 and a second passageway 38 that extends from the axial bore 30 through the cylindrical body 28. The annular groove 52 receives head 54 on output push rod 56 that surrounds reaction disc 58. Head 54 communicates an output force developed through movement of the wall 22 by a pressure differential between chambers 18 and 20 to output rod 56 connected to pistons in a master cylinder. The development of the output force is controlled by a control valve 40 located in bore 30 that responds to an input force applied to push rod 50. The control valve 40 has a plunger 42 which is retained in bore 30 by a key member 44 of the type disclosed in U.S. Pat. No. 4,953,446 and a poppet member 48 which is retained in bore 30 by a retainer member 70. A valve return spring 72 caged between the retainer member 70 and shoulder 51 on push rod 50 urges the plunger 42 toward the poppet member 48 while a poppet spring 74 urges face 49 on poppet member 48 toward an annular atmospheric seat 43 on plunger 42.

Figure 2:
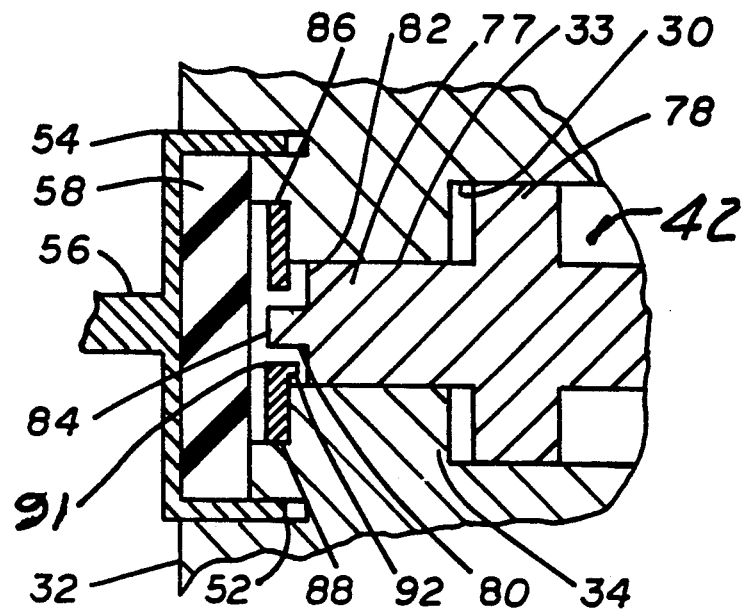
FIG. 2 is an enlarged view of the plunger, reaction member and disc member of FIG. 1.

The plunger 42 as best shown in FIG. 2 has a cylindrical body with a first diameter 78 that engages a bearing surface 33 in bore 30 of hub 24 and a second diameter 80 separated by a shoulder 82. The second diameter 80 has a face 84 which has a surface area which is located adjacent the reaction disc 58 and adapted to engage the reaction disc 58.

A disc member 86 is located in an annular groove 88 in bore 30 adjacent the reaction disc 58. Disc member 86 has a central opening 91 throughwhich the second diameter 80 extends to locate face 84 adjacent the reaction disc 58. Disc member 86 has a flange or projection 92 which extends into bore 30 to define a set distance therebetween with shoulder 82 on plunger 42 and ultimately the point in the development at which the pedal feel shifts from a soft feel to a firm feel as hereinafter described.

Figure 3:
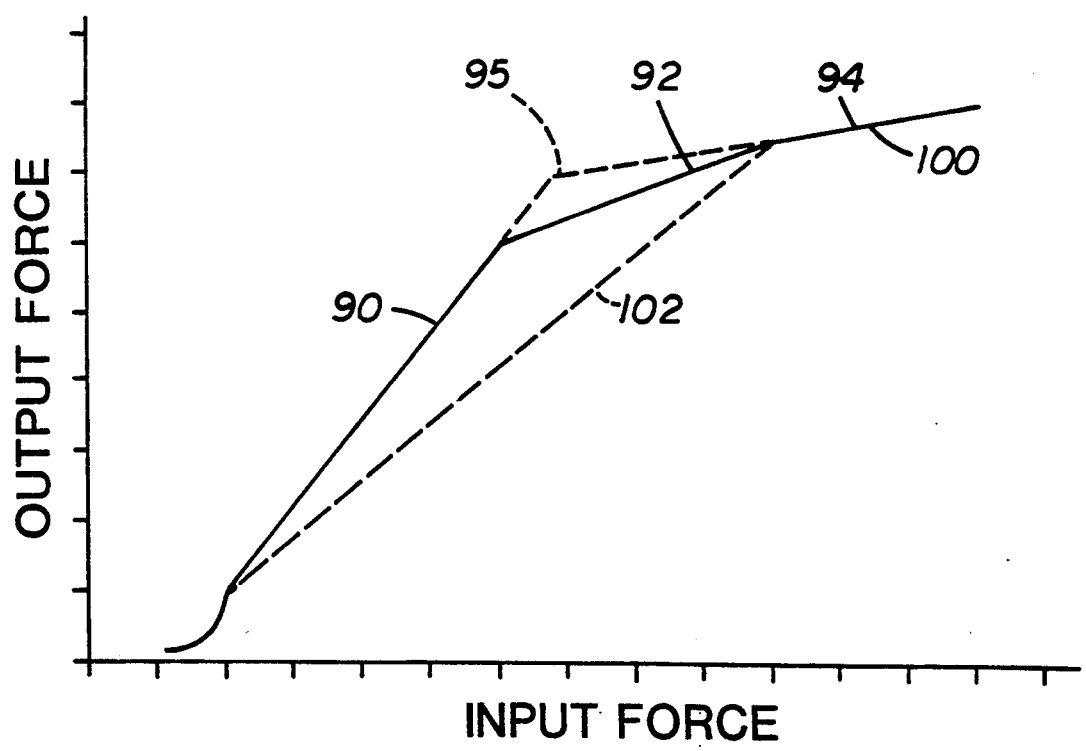
FIG. 3 is a graph illustrating distinct rates of output force development associated with input force applied to the control valve.

The brake booster 10 is located in a vehicle with chamber 18 connected to the intake manifold of an internal combustion engine through check valve 66. When the engine is in operation, vacuum is produced at the intake manifold which evacuates air from chambers 18 and 20 to allow return spring 68 to position wall 22 as shown in FIG. 1. When an operator desires to effect a brake application, an input force is applied to a brake pedal which overcomes return spring 72 and linearly moves push rod 50 and plunger 42. Initial movement of plunger 42 allows poppet spring 74 to urge face 49 on poppet 48 into engagement with vacuum seat 31 on hub 24 to assure that flow communication between the front or vacuum chamber 18 is interrupted with the rear or control chamber 20. Thereafter, annular seat 43 on plunger 42 moves away from an atmospheric seat on face 49 on poppet member 48 and allows air to flow from the environment through to poppet member 48 for distribution to the rear or control chamber 20 by way of passageway 38. With air in chamber 20 and vacuum in chamber 18, a pressure differential corresponding to the input force applied to the brake pedal is created to develop a force which acts on wall 22. After overcoming the force of return spring 68, the output force moves wall 22 toward chamber 18. The output force is communicated from wall 22 to head 54 through reaction disc 58 to provide the output rod 56 with the desired force to effect brake application. As shown in the graph of FIG. 3, the initial output force produced is a linear function which is based on the reaction force developed by the resistance of the pistons in the master cylinder to movement as communicated through area 84 provide a primary force which opposes the input force applied to the brake pedal. The ratio of the input force applied to the brake pedal and the output force produced is illustrated by segment 90 of curve 100. This ratio of input to output force is about 20:1 which is considered to provide soft pedal feel for an operator. If the output force were to continue to develop at this rate, vacuum runout would occur at point 95 which is the intersection of segments 90 and 94 of curve 100. Fortunately for most brake applications, the primary force is sufficient to move the plunger 42 such that annular face 43 engages atmospheric seat 49 and communication of air to chamber 20 is terminated to meet the desired rate of development of an output force to effect a brake application. Should the input force applied to the brake pedal be greater than primary force, plunger 42 continues to move in bore 30 such that shoulder 82 engages annular flange 92 and brings disc 86 into engagement with the reaction disc 58. Now the reaction force present in the reaction disc 58 acts on the area of disc 86 and is communicated into plunger 42 as a secondary force. Thereafter, the output force produced from input force is illustrated by segment 92 of curve 100. The ratio of input force to output force is about 10:1 which is considered to be a firm pedal for an operator. The combined primary and secondary forces oppose the input force to terminate the communication of air to the chamber 20 and correspondingly effect a brake application as a function of the input force. However, with this structure, assistance is provided to effect a brake pedal for approximately 99 percent of all brake applications. In those instances where the input force is greater that the primary and secondary forces, commonly referred to a vacuum runout, the difference therebetween is added to the output force illustrated by segment 92 as a direct 1:1 force to produce an optimum input force as illustrated by segment 94 of curve 100. In comparing curve 100 for brake booster 10 with a curve 102 for a standard brake booster, it should be apparent the plunger member and disc 86 provide structure to control the development of an output force over a greater range of power assist for a booster in which an operator has a soft pedal for approximately 80 percent of all brake applications, a firm pedal for 19 percent of all brake applications and a hard pedal for 1 percent of all brake applications.

I claim:

1. In a brake booster having valve means located in a bore of a movable wall and responsive to an input force for controlling the flow of a first fluid to a first chamber to create a pressure differential with a second fluid in a second chamber, said pressure differential acting on the movable wall to develop an output force that is transmitted through a reaction member to a output member for moving a pressurizing device to effect a desired brake application, said pressurizing device resisting movement by the output member to develop a reaction force which is transmitted through the reaction member to oppose the input force applied to said valve means and eventually terminate the communication of first fluid to said first chamber to limit the creation of said pressure differential as a function of said input force, the improvement in the valve means comprising:

a plunger having a cylindrical body located in said bore and connected to said input member, said plunger having a first diameter that engages a bearing surface on said movable wall and a second diameter separated from said first diameter by a shoulder, said second diameter having a face located adjacent said reaction member; and a disc member located in said bore adjacent said reaction member, said disc member having a central opening throughwhich said second diameter extends to locate said face adjacent said reaction member, said reaction force being communicated through said face of said plunger to provide a primary force which opposes said input force to establish an initial output force, said initial output force being a linear function of the product of the area of said face of said second diameter of said cylindrical member and said reaction force, said shoulder on said cylindrical member engaging said disc member and to communicate a secondary force which is combined with said primary force to oppose said input force to establish an intermediate output force, said intermediate output force being a linear function of the initial output force and the product of the area of said disc and reaction disc.

2. In the brake booster as recited in claim 1 wherein that portion of said input force which is greater than said primary and secondary forces is directly communicated through said plunger and combined with said initial and intermediate output forces to produce an optimum output force.

3. In the brake booster as recited in claim 1 wherein said initial output force derived by the primary force is approximately double the rate it which the secondary output force is produced to rapidly effect a brake application.

4. In the brake booster as recited in claim 3 wherein said area of said face of said second diameter of said plunger is less than the area of said disc.

5. In the brake booster as recited in claim 4 wherein the initial development of said intermediate force is directly dependent on the travel of said plunger and deformation of said reaction member by the reaction force.

6. In the brake booster as recited in claim 5 wherein said disc further includes an annular projection to define the travel required for engagement with said shoulder.

* * * * *